(12) United States Patent
Said et al.

(10) Patent No.: US 8,612,406 B1
(45) Date of Patent: Dec. 17, 2013

(54) SHARING BUSINESS DATA ACROSS NETWORKED APPLICATIONS

(75) Inventors: Bare Said, St. Leon-Rot (DE); Peter Eberlein, Malsch (DE)

(73) Assignee: SAP AG, Walldorf (DE)

(*) Notice: Subject to any disclaimer, the term of this patent is extended or adjusted under 35 U.S.C. 154(b) by 0 days.

(21) Appl. No.: 13/477,956

(22) Filed: May 22, 2012

(51) Int. Cl.
*G06F 7/00* (2006.01)
*G06F 17/00* (2006.01)
*G06F 17/30* (2006.01)

(52) U.S. Cl.
CPC .... *G06F 17/30171* (2013.01); *G06F 17/30362* (2013.01); *G06F 2221/2147* (2013.01); *Y10S 707/944* (2013.01)
USPC ............................ 707/704; 707/781; 707/944

(58) Field of Classification Search
CPC ................... G06F 17/30171; G06F 17/30362; G06F 2221/2147
USPC ......................................... 707/704, 781, 944
See application file for complete search history.

(56) References Cited

U.S. PATENT DOCUMENTS

| | | | |
|---|---|---|---|
| 7,657,575 B2 | 2/2010 | Eberlein et al. | |
| 7,702,650 B2 | 4/2010 | Brunswig et al. | |
| 7,720,992 B2 | 5/2010 | Brendle et al. | |
| 7,725,907 B2 | 5/2010 | Bloching | |
| 7,730,412 B2 | 6/2010 | Said | |
| 7,734,648 B2 | 6/2010 | Eberlein | |
| 7,739,387 B2 | 6/2010 | Eberlein et al. | |
| 7,877,695 B2 | 1/2011 | Brunswig et al. | |
| 7,900,190 B2 | 3/2011 | Brunswig et al. | |
| 7,971,209 B2 | 6/2011 | Eberlein et al. | |
| 8,126,919 B2 | 2/2012 | Eberlein | |
| 8,135,689 B2 | 3/2012 | Said et al. | |
| 2004/0260715 A1* | 12/2004 | Mongeon et al. | 707/101 |
| 2006/0171405 A1 | 8/2006 | Brendle et al. | |
| 2006/0230122 A1* | 10/2006 | Sutou et al. | 709/219 |
| 2007/0156716 A1* | 7/2007 | Said et al. | 707/100 |
| 2007/0185720 A1 | 8/2007 | Eberlein et al. | |
| 2007/0233728 A1 | 10/2007 | Puteick et al. | |
| 2007/0239800 A1 | 10/2007 | Eberlein | |
| 2007/0250705 A1* | 10/2007 | Smith et al. | 713/157 |
| 2008/0005623 A1 | 1/2008 | Said | |
| 2008/0082575 A1 | 4/2008 | Peter et al. | |
| 2008/0126410 A1 | 5/2008 | Brunswig et al. | |
| 2008/0162095 A1 | 7/2008 | Brunswig et al. | |
| 2008/0162264 A1 | 7/2008 | Bloching et al. | |
| 2008/0163083 A1 | 7/2008 | Brunswig et al. | |
| 2008/0222248 A1 | 9/2008 | Eberlein et al. | |
| 2008/0288960 A1 | 11/2008 | Eberlein et al. | |

(Continued)

OTHER PUBLICATIONS

U.S. Appl. No. 13/309,171, filed Dec. 1, 2011, Said et al.

(Continued)

*Primary Examiner* — Phong Nguyen
(74) *Attorney, Agent, or Firm* — Fish & Richardson P.C.

(57) ABSTRACT

The present disclosure describes methods, systems, and computer program products for sharing business data across networked applications. The method for sharing business data across networked applications can include receiving a request associated with data object instance via a first business application. The data object instance is of a specific data object type. A second business application is identified as an assigned master business application associated with the requested data object instance. The first business application and the second business application are based on a common application platform. Data associated with the requested data object instance is accessed at the second business application.

19 Claims, 3 Drawing Sheets

(56) References Cited

U.S. PATENT DOCUMENTS

| | | |
|---|---|---|
| 2008/0306752 A1 | 12/2008 | Wagner et al. |
| 2008/0307407 A1 | 12/2008 | Wagner et al. |
| 2009/0106371 A1 | 4/2009 | Schmidt-Karaca et al. |
| 2009/0106372 A1 | 4/2009 | Schmidt-Karaca et al. |
| 2009/0106373 A1 | 4/2009 | Schmidt-Karaca et al. |
| 2009/0144721 A1 | 6/2009 | Wagner et al. |
| 2009/0150479 A1 | 6/2009 | Eberlein |
| 2009/0172110 A1 | 7/2009 | Eberlein |
| 2009/0300649 A1* | 12/2009 | Gopal et al. ............ 719/313 |
| 2010/0058169 A1 | 3/2010 | Demant et al. |
| 2010/0088391 A1 | 4/2010 | Brunswig et al. |
| 2010/0125600 A1 | 5/2010 | Said et al. |
| 2010/0161648 A1 | 6/2010 | Eberlein et al. |
| 2010/0161675 A1 | 6/2010 | Ritter et al. |
| 2010/0161676 A1 | 6/2010 | Kazmaier et al. |
| 2010/0161682 A1 | 6/2010 | Pfeifer et al. |
| 2010/0169387 A1 | 7/2010 | Pfeifer |
| 2010/0228788 A1 | 9/2010 | Eberlein |
| 2010/0318503 A1* | 12/2010 | Romine et al. ............ 707/703 |
| 2011/0087708 A1 | 4/2011 | Teichmann et al. |
| 2011/0145571 A1 | 6/2011 | Schmidt-Karaca et al. |
| 2011/0153505 A1 | 6/2011 | Brunswig et al. |
| 2011/0154445 A1 | 6/2011 | Schmidt-Karaca et al. |
| 2011/0161342 A1* | 6/2011 | Boskamp et al. ............ 707/769 |
| 2011/0179397 A1 | 7/2011 | Pfeifer et al. |
| 2011/0307348 A1 | 12/2011 | Vasing et al. |
| 2012/0005597 A1 | 1/2012 | Eberlein |
| 2012/0005670 A1 | 1/2012 | Driesen et al. |
| 2012/0011190 A1 | 1/2012 | Driesen et al. |
| 2012/0011389 A1 | 1/2012 | Driesen et al. |
| 2012/0023125 A1 | 1/2012 | Driesen et al. |
| 2012/0030184 A1 | 2/2012 | Driesen et al. |
| 2012/0030256 A1 | 2/2012 | Pfeifer et al. |
| 2012/0036165 A1 | 2/2012 | Driesen et al. |
| 2012/0047185 A1 | 2/2012 | Driesen et al. |
| 2012/0054754 A1 | 3/2012 | Teichmann et al. |

OTHER PUBLICATIONS

U.S. Appl. No. 13/240,595, filed Sep. 22, 2011, Driesen et al.
U.S. Appl. No. 13/212,641, filed Aug. 18, 2011, Said et al.
U.S. Appl. No. 13/207,151, filed Aug. 10, 2011, Said et al.
U.S. Appl. No. 13/162,442, filed Jun. 16, 2011, Said et al.
U.S. Appl. No. 12/975,813, filed Dec. 22, 2010, Brunswig et al.
U.S. Appl. No. 12/975,096, filed Dec. 21, 2010, Jentsch et al.

* cited by examiner

SHARING BUSINESS DATA ACROSS NETWORKED APPLICATIONS

TECHNICAL FIELD

The present disclosure relates to software, computer systems, and computer-implemented methods for sharing business data across networked applications.

BACKGROUND

Modern networked applications can enable customers to access and leverage updates efficiently and at a low total cost of ownership. In many instances, customers can access data from a single modern networked application, for example, from a single business product. For data exchange between different networked applications or business products, data may need to be copied, transferred, or manipulated in other means to be used. For example, customer data stored in a sales order business product may be read and copied or duplicated to be useable in another business application or system. In some other instances, a central database (e.g., held by a third party) may also be used to provide copies of the business data to multiple applications or business products.

SUMMARY

The present disclosure describes methods, systems, and computer program products for sharing business data across networked applications. Based on the same technology and business content platform used in the networked applications, customers can use several business applications instead of one in data sharing to increase efficiency and lower costs. Additional integration functionalities across the business applications can be offered to customers by leveraging the unified infrastructure and business content to a high extent. This can increase the functional scope and decrease integration costs and efforts. In some implementations, the platform infrastructure of the networked applications is enhanced to allow sharing business data across products that are based on the same platform, sharing both transactional business documents and master data. Customers can use the data sharing mechanism to optimize their networked solution by physical sharing of transactional and master data between different networked applications. The data sharing can avoid data replication and the related drawbacks in transactional and reporting scenarios.

In a general aspect, a method for sharing business data across networked applications can include receiving a request associated with data object instance via a first business application. The data object instance is of a specific data object type. A second business application is identified as an assigned master business application associated with the requested data object instance. The first business application and the second business application are based on a common application platform. Data associated with the requested data object instance is accessed at the second business application.

These and other embodiments can each optionally include one or more of the following features. In some implementations, the master business application manages data instances of the type of the requested data object instance. Prior to accessing the data, the method can further include instantiating a new data object instance of the specific data object type at the second business application. The request associated with the data object instance is a request to instantiate the data object instance. Accessing data associated with the requested data object can further include opening a data connection between the first business application and the second application. The data object instance on the second business application can be locked. The client who requested the data object instance can interact with the data object instance. The interaction can include reading, updating, and deleting. After interaction, the data object instance is unlocked on the second business application.

These and other embodiments can each optionally include one or more of the following features. For example, the master business application assignment can be defined locally within the first business application. The master business application assignment can be modified from the second business application to a third business application. The third business application is based on a common application platform. The method can further include receiving a second request associated with a second data object instance via the first business application. The second data object instance is of the specific data object type. The third business application can be identified as the assigned master business application associated with the requested second data object instance. Data associated with the requested second data object instance can then be accessed at the third business application. In some implementations, the data object instances of the type of the requested data object instance can be locked at the second business application. The locked data object instances can be migrated to the third business application. The metadata can be updated at the first business application, the second business application, and the third business application to refer to data object instances at the third business application. In some implementations, the data object instances can include business object instances.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
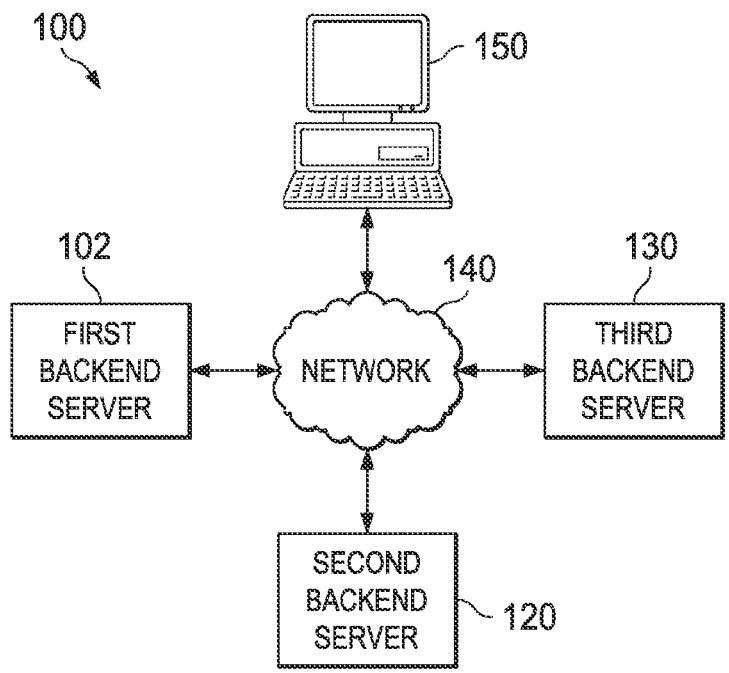
FIG. 1 illustrates an example environment 100 for implementing various features of a system for sharing data across networked applications.

This disclosure generally relates to software, computer systems, and computer-implemented methods for sharing business data across networked applications. Networks applications can be based on the same technology and business content platform as other networked applications, which allow users and customers to use several business applications in an aggregated or combined way, instead of individually, to increase efficiency and lower costs via data sharing. Additional integration functionalities across the networked business applications can be offered to customers by leveraging the unified infrastructure and business content to a high extent. This can increase the functional scope of the application environment while also decrease integration costs and efforts. For example, particular portions of business data can be saved in a master networked application as selected from the plurality of networked applications, with the data stored only at the master networked application being accessed from other networked applications without replication of the particular portions of business data on those other networked applications. The master application may be assigned to various related networked applications of a common platform. The master application may be assigned for networked solution optimization.

In some implementations, the platform infrastructure of the networked applications is enhanced to allow for sharing business data across products that are based on the same platform, sharing both transactional business documents and master data. For example, the data sharing capability among networked applications can enable the customers to store relevant business data in a specific system where that data is intuitively or inherently associated, without any requirement for business data replication across different systems. Specifically, other networked applications can access the one instance of data from the natural location and single instance of the data in the specific system, removing the need to duplicate and replicate information across the platform for each networked application and its associated system. Avoiding business data replication and duplication can reduce integration efforts and costs, therefore increasing the stability and quality of networked solutions. In addition, a significant number of operation reporting and analytics use cases can be simply realized as data that can be accessed without any replication latency when data storage is dynamically determined to be on the same system where a specific report is locally executed.

Networked applications (e.g., business software products) can be built upon a common software platform (or architecture), where the platform is used as a basis upon which multiple applications are developed and built upon the platform. As one example, proprietary on-demand business process platforms can be used to create many on-demand software products built using at least a portion of the platform. In certain implementations, on-demand products can be a fully integrated enterprise resource planning (ERP), or business management software solutions. The on-demand products can be a complete SaaS (software as a service) system in which software and its associated data are hosted centrally (for example, in a cloud-computing environment), and are accessed by users using a thin client (e.g., a web browser) over the internet.

An on-demand product may include functionality for integrated end-to-end business processes across several modules, including Customer Relationship Management (CRM), Financial Management (FM), Project Management (PM), Supply Chain Management (SCM), Supplier Relationship Management (SRM), Human Resources Management (HRM), Executive Management Support (EMS), Compliance Management (CM), among others. CRM supports processes that span marketing, sales, and service activities. FM can be another module that helps provide companies with a single, up-to-date view of the financial condition by integrating core business processes and financials that span financial, management, accounting, and cash flow management. PM can contain an integrated project management solution. SCM can cover supply chain setup management, supply chain planning and control, and manufacturing, warehousing and logistics. SRM focuses on relationships with supplies, procurement processes aimed at reducing cost, and to perform self-service procurement. HRM spans organizational management, human resources, and employee self-service. EMS can empower management with more control over the business and better decision making, with real time analytics for tracking business aspects. CM helps companies maintain compliance with changing laws and regulations and to meet regulatory standards. Some, all, or other modules or functionalities may exist in particular on-demand products.

As customers are engaging the on-demand products in their businesses, data in various aspects of the modules and functionalities is generated. Some of the data may be shared to promote their businesses and/or product uses, or for other related functionality. For example, data can be shared with other business partners to streamline supply and demand. Other data can be shared to attract future collaboration partners. By using a common platform among users of on-demand business applications, data and data object sharing can facilitate users' operation using various business applications or products. The common platform may include use of an identical platform, different versions of the common platform, and different applications based on the common platform, among others. For example, collaboration, data-sharing and business network capabilities can be provided as embedded functionality in the on-demand business applications based on the common platform.

The data sharing can be performed between connected systems associated with the same business application, or from several networked business applications based on the common platform. Multiple networked applications are built upon the common platform that enables integrated infrastructure for data implementation and generation. In some implementations, a master copy of the data is stored in one application and can be accessed in another application without any data replication. For example, a first application may need data from a second application for certain business operations. The first application, through its interfaces and network connections, sends a data request to the second application. The second application can provide the requested data to the first application by first locking the master copy of the data and providing an access connection. The first application can then interact with the master copy of the data via the access connection. After using the data in the first application, the access connection is terminated and the data is unlocked in the second application so that requests of access can be accepted from other applications, or from the first application.

At a high level, various business applications running on different systems or tenants can be enabled to share the same business data in a flexible manner to tailor different scenarios. For each networked application, administrators, or where appropriate, customers or other users, may individually define which business data can be shared. The administrators may also individually define which networked application should be declared as the master application for the defined shared business data. The master networked application is a property related to a combination of application and business data used by the applications in a federation context or networked solutions, instead of a property related to system or application. For example, a networked solution can be made of several networked applications, each of which may have the role of master application for specific business data. The business data in a federation context may be assigned only to one single master application. When an application is classified as master application for specific business data, that business data is persisted on the primary persistency or database of this networked application. The business data may be changed directly and without the usage of replication or proxy data by other networked applications. The changes can be updated to the primary database in the master application. In some implementations, administrators or customers may assign a master application for one or more business objects and/or other particular data objects at the time of application deployment. The business object encapsulates the business data, where changes made to the business data are made in or are associated with the corresponding business object, as well. The assignment can be performed based on an optimization strategy and rules defined by the customers for optimizing the networked solution.

FIG. 1 illustrates an example environment 100 for implementing various features of a system for sharing data across networked applications. The illustrated environment 100 includes, or is communicably coupled with, a front-end client 150 which represents a customer or a user in a cloud-computing environment and at least three backend server systems 102, 120, and 130. In some instances, the front-end client 150 may co-reside on a single server or system, as appropriate. At least some of the communications between the front-end client 150 and the backend servers 102, 120, and 130 may be performed across or via network 140. In general, environment 100 depicts an example configuration of a system for establishing business networks using networked applications built on a shared platform in a cloud computing environment, such as environment 100. The illustrated system includes development technology and hosted and managed services and applications built on top of the underlying platform technology.

The illustrated environment 100 of FIG. 1 includes one or more front-end clients 150. The front-end client 150 may be associated with a particular business application or development context, as well as a particular platform-based application system. The front-end client 150 may be any computing device operable to connect to or communicate with at least one of the backend servers 102, 120, and 130 using a wireline or wireless connection via the network 140, or another suitable communication means or channel. In some instances, the front-end client 150 may be a part of or associated with a business process involving one or more business applications, or alternatively, a remote developer associated with the platform or a related platform-based application.

In general, the front-end client 150 includes a processor, an interface, a networked application or application interface, a graphical user interface (GUI), and a memory. In general, the front-end client 150 includes electronic computer devices operable to receive, transmit, process, and store any appropriate data associated with the environment 100 of FIG. 1. The networked application or application interface can enable the front-end client 150 to access and interact with applications and modules in backend server systems using a common or similar platform. It will be understood that there may be any number of front-end clients 150 associated with, or external to, environment 100. For example, while illustrated environment 100 includes one front-end client 150, alternative implementations of environment 100 may include multiple clients communicably coupled to the one or more of the systems illustrated. In some instances, one or more front-end clients 150 may be associated with administrators of the environment, and may be capable of accessing and interacting with the settings and operations of one or more business applications, and/or other components of the illustrated environment 100. Additionally, there may also be one or more additional front-end clients 150 external to the illustrated portion of environment 100 capable of interacting with the environment 100 via the network 140. Further, the terms "client," "customer," and "user" may be used interchangeably as appropriate without departing from the scope of this disclosure. Moreover, while the front-end client 150 is described in terms of being used by a single user, this disclosure contemplates that many users may use one computer, or that one user may use multiple computers. In general, clients may usually belong to one customer or company. Several employees of the customer, called users, can use the applications deployed on the corresponding client. For instance, the term "client" refers to a system providing a set of business applications belonging to or rented by a particular customer or business entity. Several employees of that particular customer or business entity can be users of that client and use the business applications provided by or available on this client.

The backend servers 102, 120, and 130 represent dedicated and/or ad hoc systems built using the platform technology for coordinating collaboration with other systems associated with and executing on platform-related technology. The coordinating system is used to manage and operate the system and clients belonging to the cloud computing environment, providing knowledge of and connections to the various systems, clients, and clients therein. The backend servers 102, 120, and 130 are enhanced to support data sharing and collaboration capabilities. The front-end client 150 can access certain business applications built upon a similar, or common, on-demand platform. For example, the front-end client 150 may request certain data or data objects in a business application running in the backend server 102; and the request may be executed via the first backend server 102 at the second backend server 120 where the requested data is stored as a master copy. The data stored in the second backend server 120 may be locked and accessed by the first backend server 102, and interacted with the front-end client 150. In other instances, the data may be used by an application associated with one of the other backend servers 120, 130 for processing applications associated with those systems. The environment 100 is an example and, in alternative implementations, the elements illustrated in FIG. 1 may be included in or associated with different and/or additional servers, clients, networks, and locations other than those as shown. For example, one or more of the components illustrated within the backend servers 102, 120, and 130 may be located in multiple or different servers, cloud-based or cloud computing networks, or other locations accessible to the backend servers 102, 120, and 130 (e.g., either directly or indirectly via network 140).

In general, the backend servers 102, 120, and 130 can be any server or system that stores, manages, and executes functionality associated with an on-demand platform, including assisting in establishing ad hoc collaboration business networks between two or more users or entities executing applications based on a common platform. In some instances, the backend servers 102, 120, and 130 may execute one or more business applications (e.g., 108 of FIG. 2). For example, each backend server 102, 120, and 130 may be a Java 2 Platform, Enterprise Edition (J2EE)-compliant application server that includes Java technologies such as Enterprise JavaBeans® (EJB), J2EE Connector Architecture (JCA), Java Messaging Service (JMS), Java Naming and Directory Interface (JNDI), and Java Database Connectivity (JDBC). In some instances, each of the backend servers 102, 120, and 130 may store a plurality of various applications, while in other instances, the backend servers 102, 120, and 130 may be dedicated servers meant to store and execute certain business applications built based on the on-demand platform using the on-demand platform technology and on-demand platform business content. In some instances, the backend servers 102, 120, and 130 may include a web server or be communicably coupled with a web server, where one or more of the business applications associated with the backend servers 102, 120, and 130 represent web-based (or web-accessible) applications accessed and executed through requests and interactions received on the front-end client 150 operable to interact with the programmed tasks or operations of the corresponding on-demand platform and/or business applications.

At a high level, the backend servers 102, 120, and 130 include an electronic computing device operable to receive, transmit, process, store, or manage data and information associated with the environment 100. The backend servers 102, 120, and 130 illustrated in FIG. 1 can be responsible for receiving requests from one or more front-end clients 150 (as well as any other entity or system interacting with the backend servers 102, 120, and 130, including desktop or mobile client systems), responding to the received requests by processing said requests in an on-demand platform and/or an associated business application, and sending the appropriate responses from the appropriate component back to the requesting front-end client 150 or other requesting system. Components of the backend servers 102, 120, and 130 can also process and respond to local requests from a user locally accessing the backend servers 102, 120, and 130. Accordingly, in addition to requests from the front-end client 150 illustrated in FIG. 1, requests associated with a particular component may also be sent from internal users, external or third-party customers, and other associated business applications, business processes, as well as any other appropriate entities, individuals, systems, or computers. In some instances, either or both an on-demand platform and/or a business application may be web-based applications executing functionality associated with a networked or cloud-based business process.

As used in the present disclosure, the term "computer" is intended to encompass any suitable processing device. For example, although FIG. 1 illustrates three backend servers 102, 120, and 130, environment 100 can be implemented using any number of servers, as well as computers other than servers, including a server pool. Indeed, the backend servers 102, 120, and 130 may be any computer or processing device such as, for example, a blade server, general-purpose personal computer (PC), Macintosh®, workstation, UNIX®-based workstation, or any other suitable device. In other words, the present disclosure contemplates computers other than general purpose computers, as well as computers without conventional operating systems. Further, the illustrated backend servers 102, 120, and 130 may be adapted to execute any operating system, including Linux®, UNIX®, Windows®, Mac OS®, or any other suitable operating system.

Figure 2:
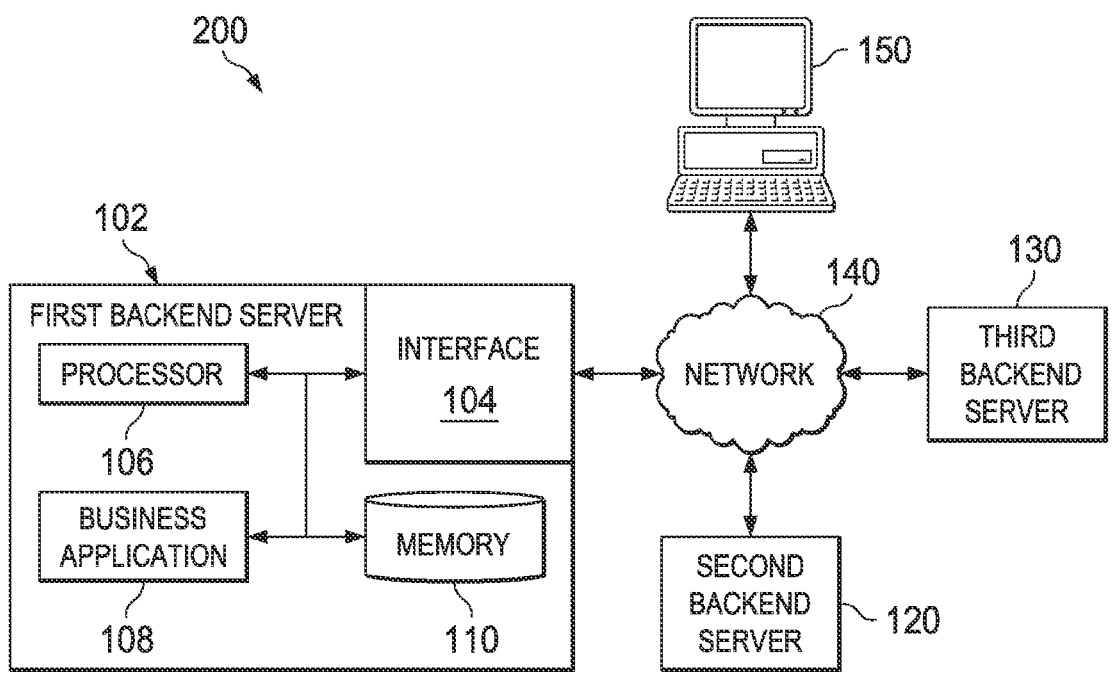
FIG. 2 is a detailed illustration of an example environment 200 for sharing data across networked applications.

FIG. 2 provides a detailed illustration of an example environment 200 for sharing data across networked applications. The environment 200 can be similar to the environment 100 as shown in FIG. 1. The first backend server 102 is illustrated in details in FIG. 2. The first backend server 102 includes an interface 104, a processor 106, a memory 110, a business application 108, and other components further illustrated in FIG. 3. In some instances, the backend servers 102, 120, and 130 and its illustrated components may be separated into multiple components executing at different servers and/or systems. For example, while FIG. 2 illustrates the business application 108 and the processor 106 as separate components, other example implementations can include the processor 106 within a separate system, as well as within as part of the business application's inherent functionality. Thus, while illustrated as a single component in the example environment 200 of FIG. 2, alternative implementations may illustrate the backend servers 102, 120, and 130 as comprising multiple parts or portions accordingly.

Both FIGS. 1 and 2 depict a server-client environment, but could also represent a cloud computing network. Various other implementations of the illustrated environment 100 or 200 can be provided to allow for increased flexibility in the underlying system, including multiple business network coordinator systems performing or executing one or more additional or alternative instances of networked applications and associated with a business application 108 for one or more different platforms, as well as multiple instances of the business application 108 and its related functionality. In those instances, the different backend servers 102, 120, and 130 may communicate with each other via a cloud-based network or through the connections provided by network 140.

In FIG. 2, the interface 104 is used by the first backend server 102 to communicate with other systems in a client-server or other distributed environment (including within environment 200) connected to the network 140 (e.g., one of the front-end clients 150, as well as other clients or backend servers communicably coupled to the network 140). The interface 104 generally includes logic encoded software and/or hardware in a suitable combination and operable to communicate with the network 140. More specifically, the interface 104 may comprise software supporting one or more communication protocols associated with communications such that the network 140 or the interface's hardware is operable to communicate physical signals within and outside of the illustrated environment 100. Generally, the backend servers 102, 120, and 130 may be communicably coupled with a network 140 that facilitates wireless or wireline communications between the components of the environment 200 (i.e., among the backend servers 102, 120, and 130 and/or one or more front-end clients 150), as well as with any other local or remote computer, such as additional clients, servers, or other devices communicably coupled to network 140, including those not illustrated in FIG. 2. In the illustrated environment, the network 140 is depicted as a single network, but may be comprised of more than one network without departing from the scope of this disclosure, so long as at least a portion of the network 140 may facilitate communications between senders and recipients. In some instances, one or more of the components associated with the backend servers 102, 120, and 130 may be included within the network 140 as one or more cloud-based services or operations.

The network 140 may be all or a portion of an enterprise or secured network, while in another instance, at least a portion of the network 140 may represent a connection to the Internet. In the illustrated example, at least a portion of the network 140 includes a portion of a cellular or mobile data network or other network capable of relaying SMS messages. In some instances, a portion of the network 140 may be a virtual private network (VPN). Further, all or a portion of the network 140 can include either a wireline or wireless link. Example wireless links may include 802.11a/b/g/n, 802.20, WiMax®, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 2, the first backend server 102 includes a processor 106. Although illustrated as a single processor 106 in the backend server 102, two or more processors may be used in the backend server 102 according to particular needs, desires, or particular embodiments of environment 200. The backend servers 120 and 130, as well as other backend systems, may similarly include one or more processors. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the backend server 102, and, specifically, the functionality associated with the corresponding business application 108. In one implementation, the server's processor 106 executes the functionality required to receive and respond to requests and instructions from the front-end client 150, as well as the functionality required to perform the operations of the associated business application 108 and an on-demand platform, among others.

At a high level, each business application 108 is any application, program, module, process, or other software that may execute, change, delete, generate, or otherwise manage information associated with the backend server 102, and in some cases, a business process performing and executing business process-related events. In particular, business processes communicate with other users, applications, systems, and components to send, receive, and process events. In some instances, a particular business application 108 may operate in response to and in connection with one or more requests received from an associated client or other remote client. Additionally, a particular business application 108 may operate in response to and in connection with one or more requests received from other business applications external to the backend server 102. In some instances, the business application 108 can be a networked application, for example, the business application 108 is built on a common platform with one or more applications in either or both of the backend servers 120 and 130. In some instances, the business application 108 may request additional processing or information from an external system or application. In some instances, each business application 108 may represent a web-based application accessed and executed by the front-end client 150 via the network 140 (e.g., through the Internet, or via one or more cloud-based services associated with the business application 108).

Further, while illustrated as internal to the backend server 102, one or more processes associated with a particular business application 108 may be stored, referenced, or executed remotely. For example, a portion of a particular business application 108 may be a web service that is remotely called, while another portion of the business application 108 may be an interface object or agent bundled for processing at a remote system (not illustrated). Moreover, any or all of a particular business application 108 may be a child or sub-module of another software module or enterprise application (e.g., the backend servers 120 and 130) without departing from the scope of this disclosure. Still further, portions of the particular business application 108 may be executed or accessed by a user working directly at the backend servers 102, as well as remotely at corresponding front-end client 150.

Regardless of the particular implementation, "application" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java®, Visual Basic®, assembler, Perl®, any suitable version of 4GL, as well as others. It will be understood that while portions of the software illustrated in FIG. 2 and FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 200, the processor 106 executes the corresponding business application 108 stored on the associated backend servers 120. In some instances, a particular backend server may be associated with the execution of two or more business applications (and other related components), as well as one or more distributed applications executing across two or more servers executing the functionality associated with the backend servers.

FIG. 2 further includes memory 110 in the backend server 102. For example, the backend server 102 can host a master application for a particular data object, which is stored at the memory 110. The data object stored at the memory 110 may be accessed by other networked applications, for example, by applications of the backend servers 120 and 130. The data access does not require data replication and therefore can be stored at a single location (i.e., the memory 110). In addition, the memory 110 of the backend server 120 stores data and program instructions for the business application 108. The memory 110 may include any memory or database module and may take the form of volatile or non-volatile memory including, without limitation, magnetic media, optical media, random access memory (RAM), read-only memory (ROM), removable media, or any other suitable local or remote memory component.

The memory 110 may store various objects, object models, and data, including classes, frameworks, applications, backup data, business objects, jobs, web pages, web page templates, database tables, process contexts, repositories storing services local to the backend server 120 and any other appropriate information including any parameters, variables, algorithms, instructions, rules, constraints, or references thereto associated with the purposes of the backend server 120 and its functionality. In some implementations, including in a cloud-based system, some or all of the memory 110 may be stored remote from the backend server 120 and communicably coupled to the backend server 120 for usage. As described above, memory 110 can include one or more meta-models associated with various objects included in or associated with the underlying platform. Specifically, memory 110 can store items and entities related to the business application 108 and/or other collaboration-related entities or components. Some or all of the elements illustrated within memory 110 may be stored external to the memory 110. These items may be made accessible to the business application 108 as illustrated in FIG. 2.

As used in this disclosure, in both FIGS. 1 and 2, the front-end client 150 is intended to encompass a personal computer, touch screen terminal, workstation, network computer, kiosk, wireless data port, smart phone, personal data assistant (PDA), one or more processors within these or other devices, or any other suitable processing device. For example, the front-end client 150 may comprise a computer that includes an input device, such as a keypad, touch screen, mouse, or other device that can accept user information, and an output device that conveys information associated with the operation of one or more business applications, on-demand platforms, and/or the front-end client 150 itself, including digital data, visual information, or GUI. Both the input and output device may include fixed or removable storage media such as a magnetic storage media, CD-ROM, or other suitable media, to both receive input from and provide output to users of front-end client 150 through the display, namely, the GUI. The clients' processors, interfaces, and memories may be similar to or different from those described in connection with the other components illustrated in FIG. 2, although alternative implementations of one or more of these components may be used, as well as implementations where additional components may also be included.

Figure 3:
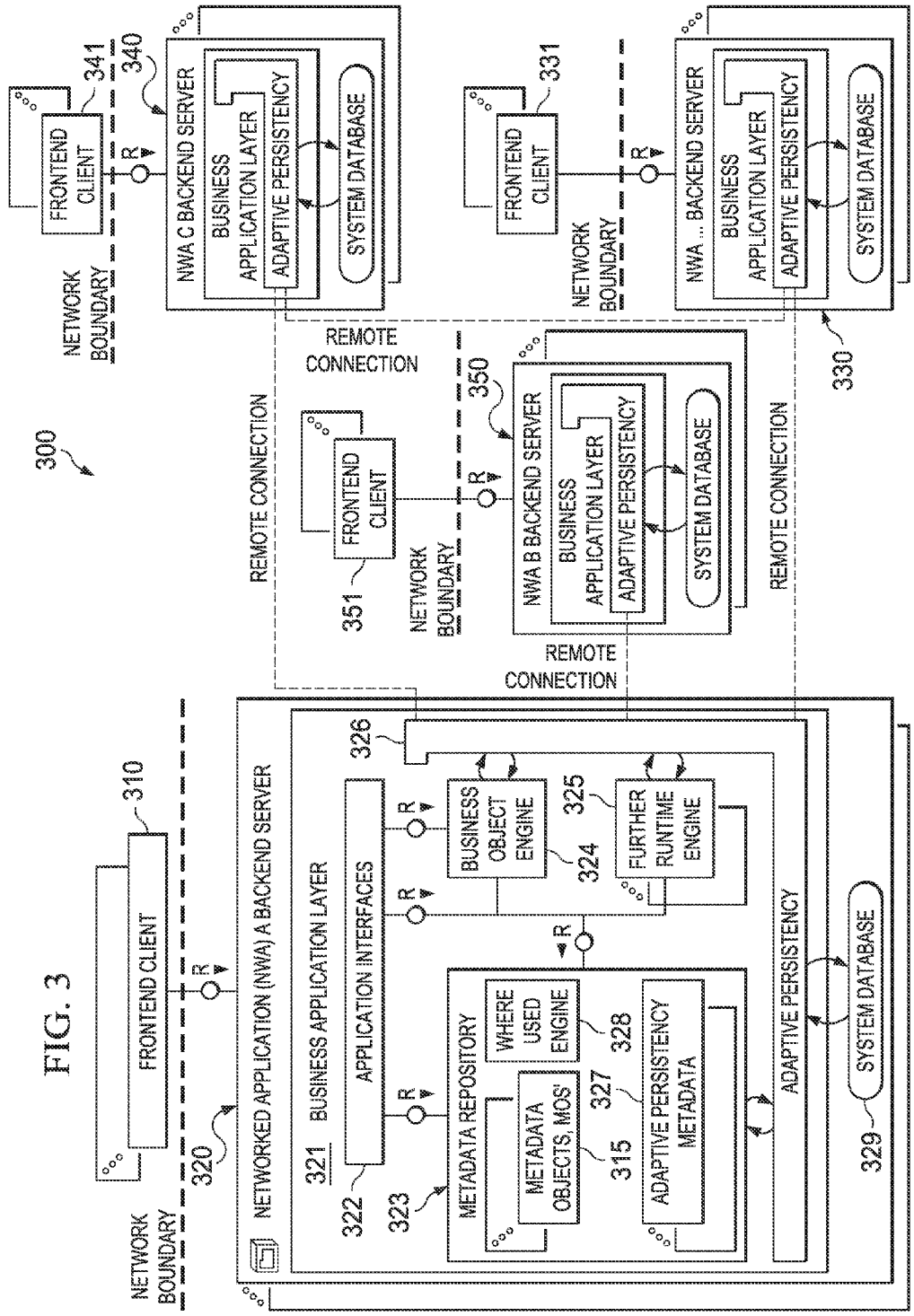
FIG. 3 is a detailed illustration of an example system 300 applicable to the example environment 200 of FIG. 2.

FIG. 3 is a detailed illustration of an example system 300 applicable to the example environment 200 of FIG. 2. The example system 300 can be one specific and/or an alternative implementation of the example environment shown in FIG. 2, with business application layers further illustrated. In FIG. 3, the example system 300 includes the front-end client 310. The front-end client 310 is using networked applications based on a common software platform, for example, the networked applications supported by the backend server 320. The backend server 320 includes a business application layer 321 and a system database 329. The business application layer 321 includes at least one application interface 322, a metadata repository 323, a business object engine 324, further runtime engine 325, and an adaptive persistency interface 326. Different types of metadata objects can have their own runtime engine, represented here by the further runtime engine 325. In the illustrated example, a focus is placed on the business objects and their associated business object engine 324, although other metadata or data objects may be associated with the described functionality. In some implementations, the business application layer 321 can include multiple functionalities and modules for running networked applications. For example, the business application layer 321 may include or be associated with various modules or applications, including CRM, FM, PM, SCM, SRM, HRM, EMS, CM, among others.

At a high level, the system 300 further includes other front-end clients 331, 341, and 351, as well as other backend servers 330, 340, and 350, which may respectively share structural and functional similarities with the front-end client 310 and the backend server 320. The backend servers 320, 330, 340, and 350 are based on a common application platform, for example, an on-demand platform. In some implementations, the front-end client 310 may request to access business data that is stored in a remote backend server. For example, the backend server 330 may be assigned as the master application for storing the requested business data encapsulated in certain business objects or business object types. The front-end client 310 can access the business data via a first networked application in the backend server 320 and a second networked application in the second networked application may instantiate a new data object instance of the specific data object type when the request by the front-end client 310 is a request to instantiate the data object instance. The accessing process may include opening a data connection between the first networked application and the second networked application. The data object instance on the second networked application is then locked, as the second networked application is assigned as the master application. The front-end client 310 can interact with the data object instance, including reading, updating, and/or deleting the data object instance. When the front-end client 310 completes the interaction, the second networked application unlocks the data object instance. In some instances, the front-end client 310 may request business data from the first networked application without concern as to where the master application is located. For example, from a user stand point, data stored in any networked application may be shared, visible, and accessible to other networked applications. The front-end client 310 may send a request for business data via the first networked application and allow the metadata repository 323 of the backend server 320 to identify the master application that is storing the requested business data.

To provide complete integration, each of the backend servers 320, 330, 340, and 350 may be able to support networked applications based on a common development platform, for example, a platform that is model based, and in some instances, business object-oriented. The business data for the networked applications can be shared in a networked solution based on these networked applications running at the backend servers 320, 330, 340 and 350. The business data is classified and encapsulated with redundancy-free business objects exposing the data via standardized core services, therefore providing a secure way to manipulate and access the business data. For example, a business object can be an employee object or a product object. The definition of the business object can be implemented in the common development platform. The networked applications based on the platform and using the business object can interface with the same model, structure, services, and behavior. Data persistency of a business object can therefore be linked to other databases or tenants without impacting the networked applications. This is because the networked applications interface only with the business object core services. In addition, the standard implementation of business objects via the common platform enables the networked solution, because the business objects can interface with the database via a standardized layer that introduces the adaptive persistency component with configurable database determining a feasible task. In addition to master data business objects, the networked applications may share any suitable data object, including content data objects such as common code lists, or transactional business documents such as sales order objects.

In some implementations, a networked solution can include various on-demand networked applications, for example, Human Capital Management (HCM), Travel and Expense Management (TEM), Sales On-Demand (SOD), among others. The three example networked applications may hold employee master data, sales representative data, and other employee related data. Conventionally, this data may be synchronized between all three networked applications, for example, this data may be replicated and synchronized in all three networked applications via an initial and delta load replication mechanism. However, as presented in this disclosure, this data is persisted once in one of the three networked applications, avoiding business data replication by harmonizing business object models and accessing the employee data persisted in other networked applications. For example, the HCM may be classified as the canonical master for the "Employee" business object. When TEM or SOD are deployed, the customers may configure the master application of the business object "Employee" in both deployed applications (i.e., TEM or SOD) to be the already deployed HCM. Therefore the business object "Employee" can be configured in TEM or SOD via HCM without replication, by accessing the business object in the master application HCM. A more general embodiment is given in FIG. 3 as follows.

As illustrated in FIG. 3, the front-end client 310 can interact with the backend server 320 or one or more networked applications of the backend server 320. The operation at the front-end client 310 may be realized on a web browser running on a remote computer. The front-end client 310 may access various modules of the backend server 320 without previous local installation of the running networked applications, as components of the networked applications can be downloaded based on the demand of the front-end client 310. The business application layer 321 supports the operation of the networked applications accessed by the front-end client 310. The application interface 322 enables the networked applications to interact with the metadata repository 323, the business object engine 324, and the further runtime engine 325. Interactions among the components may also occur. The components may interact with the adaptive persistency interface 326, and through the interface 326, interact with the system database 329 or with other system's database 330, 340, 350.

The illustrated metadata repository 323 includes metadata objects 315, a where-used engine 328, and an adaptive persistency metadata 327. The metadata objects 315 can be objects used to exchange metadata information between components, parties, or modules in the networked solution. The metadata objects 315 can include business objects, process interfaces, user interfaces, and other types of metadata objects. The where-used engine 328 may identify and record access and usage records of various metadata and metadata objects, as well as in which locations particular metadata objects 315 may be used. The adaptive persistency metadata 327 can interact with the adaptive persistency interface 326 to allow exchanges data with the system database 329, as well as with one or more external systems. The adaptive persistency metadata 327 may further contain information regarding the master application for each business object (or other metadata object) as configured by customers or administrators, or as provided by default. The business object engine 324 may instantiate business objects and the related business data, as well as process business object-related operations and functionality. The business object engine 324 can interact with the adaptive persistency interface 326 as well. The further runtime engine 325 may instantiate other metadata objects and the related data, as well as process their operations and functionality. The adaptive persistency interface 326 can establish connection with other backend servers, such as the backend servers 330, 340, and 350 at their adaptive persistency interfaces, and delegate data access operations to those components.

The business object metadata stored in the metadata repository 323 may be enhanced to contain additional attributes that specify a master application after deployment time. Business objects used in a networked application may be configured by default to have this application as master application when this application is deployed or installed. For example, when an SOD application is deployed at one of the backend servers 320, 330, 340 and 350, the business objects (e.g., an "Employee" business object) used within this application can have the SOD application configured as master application by default. Consequently, the "Employee" data can be retrieved or written to the primary database of the SOD application. In some implementations, a fine tuning step may be allowed for customers or administrators to change the master application of business objects. For example, the default assignment may be overridden and a new assignment to a new application can be configured. In some instances, prerequisites for allowing a new application to be chosen as the new master application may include a need for the application to be deployed and running as an application in a networked solution, and/or that the new application needs to use the same business object for which it will be the master application. The master application assignment may be initiated at any point in time after data consolidation (e.g., data is not currently used or modified by any applications or users).

The flexible master application assignment on business objects level can offer customers optimization options for their networked solutions. The customers can determine the amount of business data to be shared and which applications shall have remote and/or local access and priority. The optimization and the configuration can be done for the use case or business scenario, based on the combination of data access frequencies, data access type (e.g., read or write), and data usage type (e.g., transactional or analytics).

The adaptive persistency interface 326 can enable business data sharing via a flexible and dynamic access to multiple databases, dependable on business object configuration. The adaptive persistency interface 326 may be triggered during data retrieval or data storage of business object data. The adaptive persistency interface 326 can read the master application assignment of the data or business object whose core service or associated functionality is invoked and determines the database where business data are located. Upon request, a database connection can be established and data can be retrieved or persisted, depending on which core service is invoked. In some implementations where consistent data read or data change is needed, a business object locking mechanism may be set. An additional locking mechanism may also be introduced on top of the native locking mechanism. The additional locking mechanism may be done on a business object level and can be controlled and managed by the adaptive persistency interface 326. The adaptive persistency interface can administrate a lock table on business object level. A business object lock can be only set in the master application to which the business object is assigned. In some implementations, prior to storing or retrieving the data, the adaptive persistency interface 326 can attempt to lock the invoked business object. The adaptive persistency interface 326 can set a lock locally at the master application to which the accessed business object is assigned. If the locking operation is interrupted, an error message can be prompted and the operation is terminated.

In some implementations, the backend server 320 receives a request associated with a data object instance from the front-end client 310. The front-end client 310 may initiate the request via a business application provided at the backend server 320. For example, the business application can be a networked application including one or more of HCM, TEM, SOD, CRM, FM, PM, SCM, SRM, HRM, EMS, CM. The data object instance can be of a specific data object type. For example, the data object instance can be related to the "Employee" data. The system 300 then identifies a second business application as an assigned master business application associated with the requested data object instance. For example, the backend server 330 can host an assigned master business application and be identified by the system 300. In this case, the business application on the backend server 320 shares a common or similar application platform with the assigned master business application on the backend server 330. The data associated with the requested data object instance can then be accessed at the master business application on the backend server 320. The data can be access without replication or synchronization between the backend servers 320 and 330. However, the data are locked during the accessing operation and are modifiable only by the backend server 320.

In some implementations, the master business application at the backend server 330 manages data instances of the type of the requested data object instance. For example, the master business application can be assigned to manage data instances of type Sales Order business object. In some implementations, prior to accessing the data, a new data object instance of the specific data object type is instantiated at the master business application. The request associated with the data object instance can be a request to instantiate the data object instance. In some implementations, the data is described and modeled using a metadata model based development infrastructure. For example, a higher level structure can include node elements, nodes, core services, and other high level structures. Each of these high level structures can include lower level data types such as business object, process agent, work center, and others. These lower level data types can further include sub-level objects that are more specific, for example, the lower level data types can include sales order, invoice, partner, and other information. The lower level data types can be instantiated when higher level information and specific parameters are available. Using metadata model-based implementation enables and supports a generic and flexible data access across different systems In some implementations, the accessing data operation can include opening a data connection between the business application at the backend server 320 and the master business application at the backend server 330. As the connection is established, the data object instance on the master business application at the backend server 330 is locked. For example, the data object instance becomes non-modifiable by any other business applications except for the requesting business application at the backend server 320. Using the data connection, the business application at the backend server 320 can interact with the data object instance. For example, the interaction may include reading and displaying the data, updating the data by adding, removing, or changing the data, or in some instances, deleting the data. The updated data object instance can be saved after interaction, and the data object instance can be unlocked at the master business application at the backend server 330.

In some implementations, the master business application assignment can be modified from the master business application at the backend server 330 to another business application at another backend server, for example, a business application of the backend server 340. In this case, the related object instances will be migrated from the database of the system 330 to the data base of system 340. Additionally, the metadata at all the networked applications, i.e., the first business application of the backend server 320, the second business application of the backend server 330, and the third business application of the backend server 340, can then be updated by referring to the data object instances at the third business application (i.e., the new master application) of the backend server 340. In the illustrated example, the three business applications of the backend servers 320, 330, and 340 are based on a common or similar application platform, such as the on-demand platform. A request associated with another data object instance may be received from the business application at the backend server 320. The master business application associated with this request can be identified, for example, at the business application of the backend server 340. A connection between the business applications of the backend servers 320 and 340 can then be established and data associated with the requested data object instance can be accessed at the master business application of the backend server 340.

Figure 4:
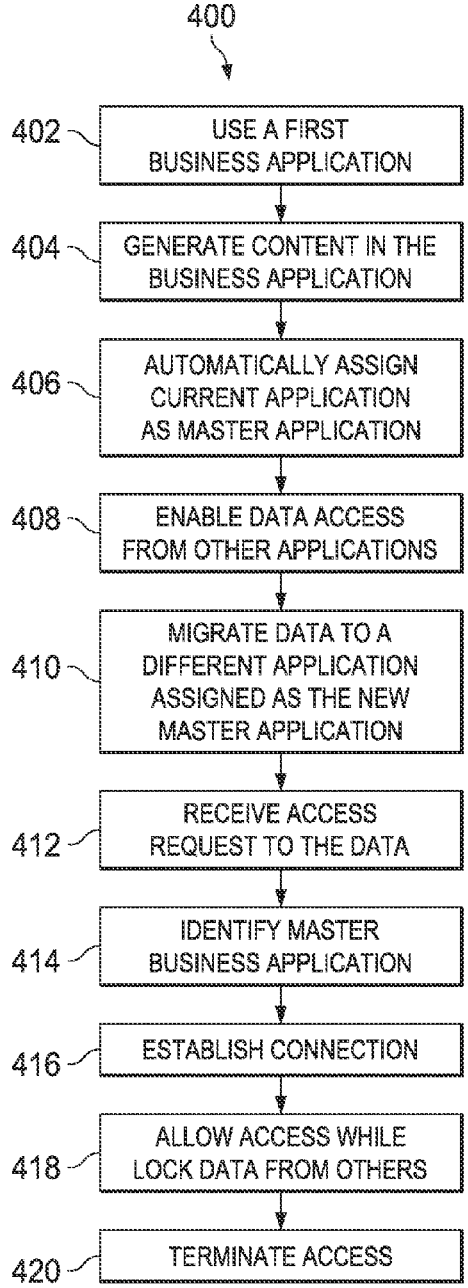
FIG. 4 illustrates an example method for sharing data across networked applications from a user perspective.

FIG. 4 illustrates an example method 400 for sharing data across networked applications from a user perspective. The method 400 may apply to the example system 300 illustrated in FIG. 3 from the viewpoint of the front-end client 310. At 402, a front-end client may use a first business application supported by a backend system on a common application platform. For example, the front-end client can be the front-end client 150 of FIG. 1. As the front-end client operates on the first business application, content or data are generated in the application at 404. The content or data may have a specific data object type for the business application. The content or data may be stored in the backend server system supporting the first business application.

At 406, the current business application can automatically be assigned as the master application. For example, the business application can be configured by default such that content or data created within the business application will assign the current business application as the master application. In some implementations, users (such as the system administrator associated with a particular customer) may change the configuration such that another business application on the common platform is assigned as the master application and at the creation of the content or data. After the creation of the content or data, the front-end client can enable data access from other applications by setting attributes or properties to the created content or data at 408, for example, setting the content or data to be shared among business applications on the common platform.

In some implementations, after creation of the content or data, the content or data may be migrated, as opposed to duplicated or replicated, to a different application that is assigned as the new master application at 410. For example, the front-end client may have created certain content or data at business application A and set business application A as the original master application. When other applications access the created content or data, they would first establish connection with the business application A and interact with the content or data stored at the business application A. For management efficiency or other reasons, the front-end client would like to assign business application B as the master application. The front-end client can configure the master application assignment and migrate the content or data to business application B. By using an adaptive persistency interface, the migrated content or data may be accessed from other business applications on different backend server systems based on a common application platform. For example, at 412, the master application (i.e., the business application B) may receive an access request from other business applications operated by other clients. The master application and the related backend server may need to be identified at 414. For example, the system enables identification based on specific data object type in search for the corresponding master application.

At 416, as the master application has been identified, a connection is established between the master application and the requesting business application of the backend server. At 418, access to the data is allowed. In some implementations, the master application can use a locking mechanism to lock the data object instance such that any third application may not interact with the requested data while the requested data is being accessed by the requesting business application. The requesting business application can interact with the data object instance, for example, the requesting business application can read, update, or delete some or all of the requested data. At the end of the data access session, the requesting business application may terminate the access and the master application unlocks the data object instance at 420.

Figure 5:
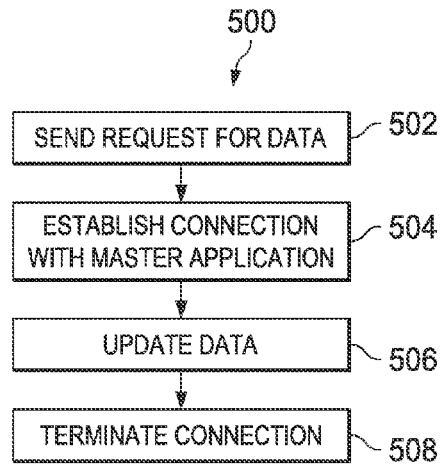
FIG. 5 illustrates an example method for obtaining shared data on the networked applications from a user perspective.

FIG. 5 illustrates an example method 500 for obtaining shared data on the networked applications from a user perspective. The method 500 may apply to front-end clients not creating data but accessing and updating existing data from business applications on a common application platform. For example, in the example system 300 illustrated in FIG. 3, the method 500 may be applied to the front-end clients 331, 341, and 351 for their access to the data created and shared by the front-end client 310. At 502, the requesting client can send a request associated with a data object instance via its business application. The data object instance can have a specific data object type. After the master application for the data object business has been identified, at 504, a connection with the master application is established. The connection establishment can include locking the data object instance at the master application and enabling access from the requesting client.

At 506, the requesting client may access and interact with the data, for example, reading, updating, or deleting the data at an application of the requesting client. In some implementations, the requesting client may read the data by instantiating lower level instances from higher level structures. For example, the data from the master application may include a business object, process agent, work center, or other appropriate content. The requesting client may instantiate the data into lower level instances such as, for example, sales order, invoice, location, partner, among others. After data update, the client may terminate the connection at 508. The termination operation may release the locking action on the data object instance at the master application.

Figure 6:
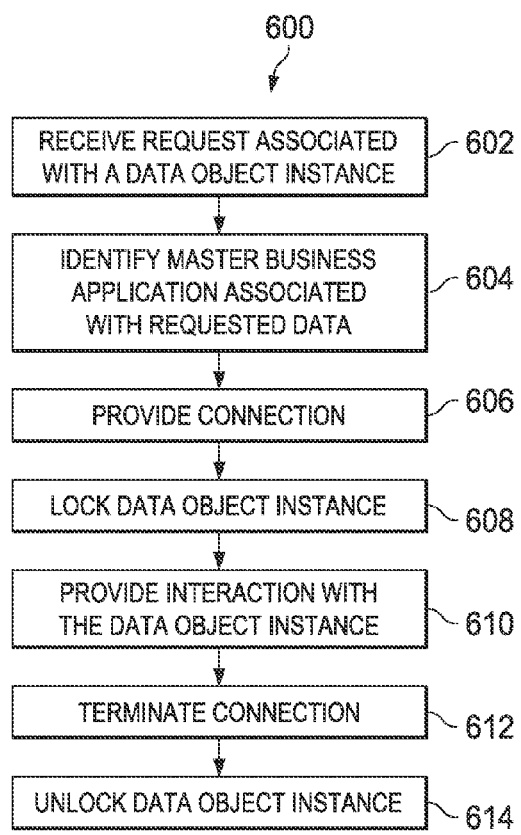
FIG. 6 illustrates an example method for sharing data across networked applications from a system perspective.

FIG. 6 illustrates an example method 600 for sharing data across networked applications from a system perspective. The method 600 may apply to the environment shown in FIGS. 1 and 2, as well as the example system 300 shown in FIG. 3. At 602, a backend server supporting a business application may receive a request associated with a data object instance from a front-end client. The data object instance can be of a specific data object type. At 604, the master application associated with the requested data object instance is identified. The master application and the business application of the backend server are based on a common application platform, for example, an on-demand business application platform.

At 606, the master application provides a data connection to the requesting business application. In some implementations, prior to the connection, the master application can lock the data object instance from being modified by other business applications at 608. At 610, the master application provides the requesting business application with interaction with the data object instance. The interaction can include reading, updating, deleting, or other appropriate data modification. After the requesting business application has completed data update, at 612, the access connection is terminated. At 614, the master application unlocks the data object instance.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method, comprising:
   receiving a request with a first business application, the request associated with a data object instance of a specific data object type assigned to a second business application, wherein the second application is a master business application;
   identifying, by operation of a computer comprising at least one processor, the second business application as the assigned master business application associated with the requested data object instance, wherein the first business application and the second business application are based on a common application platform, and wherein the second business application locks the requested data object instance from modification by business applications other than the first business application and provides a data connection to the first business application; and
   receiving access from the second business application to data associated with the requested data object instance, wherein the second business application:
   opens the data connection between the first business application and the second business application;
   permits access to the data object instance data; and
   unlocks the data object instance upon termination of access by the first business application.

2. The computer-implemented method of claim 1, wherein the master business application manages data instances of the type of the requested data object instance.

3. The computer-implemented method of claim 1, further comprising, prior to providing access to the data, instantiating a new data object instance of the specific data object type at the second business application, wherein the request associated with the data object instance is a request to instantiate the data object instance.

4. The computer-implemented method of claim 1, wherein interacting is at least one of reading, updating, or deleting.

5. The computer-implemented method of claim 1, wherein the master business application assignment is defined locally within the first business application.

6. The computer-implemented method of claim 5, wherein the master business application assignment is modified from the second business application to a third business application, wherein the third business application is based on a common application platform.

7. The computer-implemented method of claim 6, further comprising:
   receiving a second request associated with a second data object instance via the first business application, wherein the second data object instance is of the specific data object type;
   identifying the third business application as the assigned master business application associated with the requested second data object instance;
   accessing data associated with the requested second data object instance at the third business application.

8. The computer-implemented method of claim 6, wherein further comprising:
- locking the data object instances of the type of the requested data object instance at the second business application;
- migrating the locked data object instances to the third business application; and
- updating metadata at the first business application, the second business application, and the third business application to refer to data object instances at the third business application.

9. The computer-implemented method of claim 8, wherein the data object instances comprise business object instances.

10. A computer-accessible, non-transitory, storage medium encoded with computer-readable instructions configured to cause one or more data processing apparatus to perform operations comprising:
- receiving a request with a first business application, the request associated with a data object instance of a specific data object type assigned to a second business application, wherein the second application is a master business application;
- identifying the second business application as the assigned master business application associated with the requested data object instance, wherein the first business application and the second business application are based on a common application platform, and wherein the second business application locks the requested data object instance from modification by business applications other than the first business application and provides a data connection to the first business application; and
- receiving access from the second business application to data associated with the requested data object instance, wherein the second business application:
  - opens the data connection between the first business application and the second business application;
  - permits access to the data object instance data; and
  - unlocks the data object instance upon termination of access by the first business application.

11. The computer storage medium of claim 10, wherein the master business application manages data instances of the type of the requested data object instance.

12. The computer storage medium of claim 10, further comprising instructions that when executed by one or more computers cause the one or more computers to perform operations comprising, prior to accessing the data, instantiating a new data object instance of the specific data object type at the second business application, wherein the request associated with the data object instance is a request to instantiate the data object instance.

13. The computer storage medium of claim 10, wherein the master business application assignment is defined locally within the first business application.

14. The computer storage medium of claim 13, wherein the master business application assignment is modified from the second business application to a third business application, wherein the third business application is based on a common application platform.

15. A system comprising:
- memory configured to store a data object; and
- at least one hardware processor interoperably coupled to the memory and configured to perform operations comprising:
  - receiving a request with a first business application, the request associated with a data object instance of a specific data object type assigned to a second business application, wherein the second application is a master business application;
  - identifying the second business application as the assigned master business application associated with the requested data object instance, wherein the first business application and the second business application are based on a common application platform, and wherein the second business application locks the requested data object instance from modification by business applications other than the first business application and provides a data connection to the first business application; and
  - providing access to data associated with the requested data object instance at the second business application, wherein prior to providing the access to data, instantiating a new data object instance of the specific data object type at the second business application, wherein the request associated with the data object instance is a request to instantiate the data object instance.

16. The system of claim 15, wherein the master business application manages data instances of the type of the requested data object instance.

17. The system of claim 15, wherein the second business application:
- opens the data connection between the first business application and the second business application;
- permits access to the data object instance data; and
- unlocks the data object instance upon termination of access by the first business application.

18. The system of claim 15, wherein the master business application assignment is defined locally within the first business application.

19. The system of claim 18, wherein the master business application assignment is modified from the second business application to a third business application, wherein the third business application is based on a common application platform.

* * * * *